United States Patent Office.

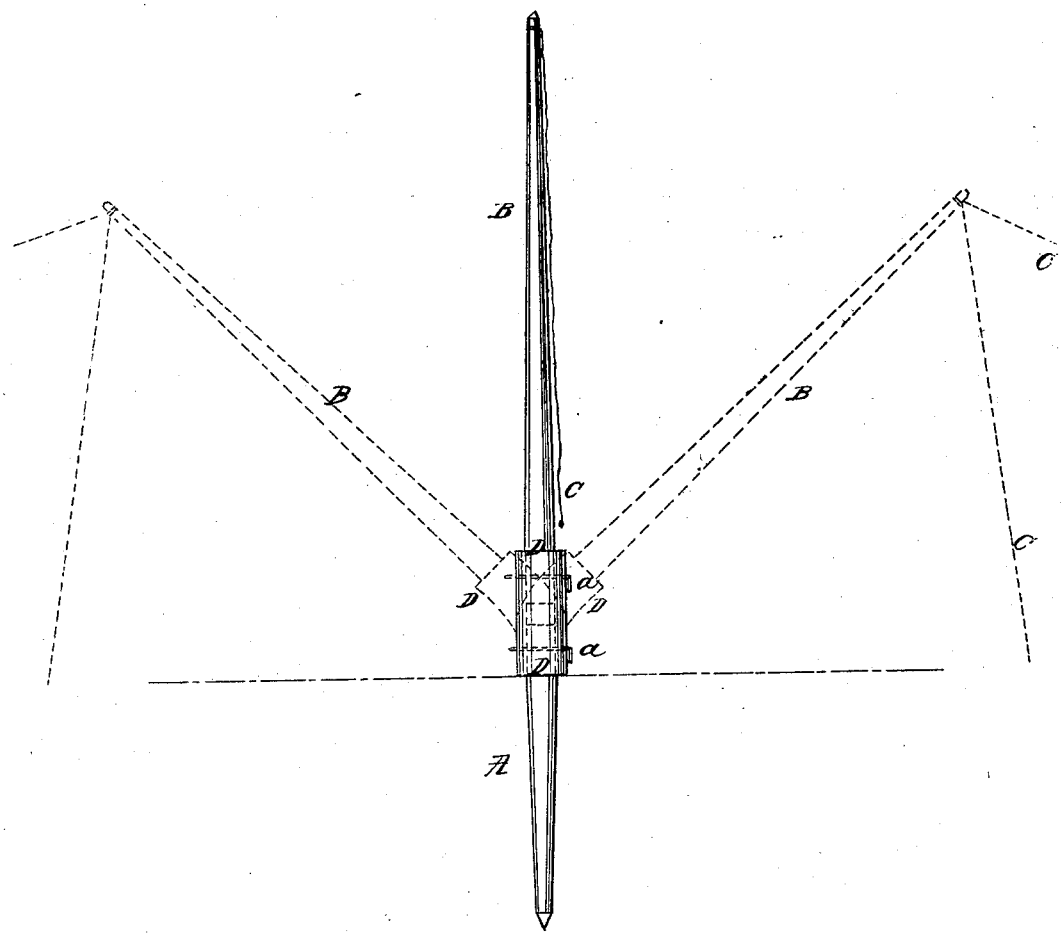

B. G. FITZHUGH, OF SYKESVILLE, MARYLAND.

Letters Patent No. 67,744, dated August 13, 1867.

---

IMPROVEMENT IN TETHERING-STAKE.

---

*The Schedule referred to in these Letters Patent and making part of the same.*

---

TO ALL WHOM IT MAY CONCERN:

Be it known that I, B. G. FITZHUGH, of Sykesville, in the county of Howard, and State of Maryland, have invented a new and useful Improvement in Tethering-Posts or Stakes for Tethering Animals; and I do hereby declare the following to be a full, clear, and exact description of the same, reference being had to the accompanying drawing, and the letters of reference thereon, making a part of this specification.

As heretofore made these tethering-stakes were very clumsy, and inconvenient to carry around and set up or take down, having a heavy weight or metal spring, and a hinge joint, so as to keep the rope or line taut by which the animal was fastened to it.

My invention consists in uniting the upper and under portions of the tethering-stake by a piece of rubber, by preference rubber tubing as it is found in the market, this rubber forming both the joint and counterpoise for keeping the upper part of the post or stake in as nearly a vertical position as the feeding position of the animal will admit of, and keeping the line, rope, or strap taut and out of the way. The rubber, too, forms an elastic joint, which admits of the animal feeding around and around the post without winding up the rope, line, or tethering-cord.

To enable others skilled in the art to make and use my invention, I will proceed to describe the same with reference to the drawings.

A represents the lower, or portion of the stake that is driven or set in or on the ground; this piece should be of stout wood. B is the upper portion of the stake, which may be of light wood, cane, bamboo, or other material, strong enough to hold the tethering-line or cord C, to which the animal is fastened. The pieces A B are united by a piece of vulcanized rubber, D, (so called) or material of which rubber is an essential component. I prefer to use a piece of common rubber hose, with a pin passed through it, as at $a$ $a$, to hold it to the two parts of the stake or post, and to keep itself in proper position. It is obvious that instead of using tubular rubber, and putting the pieces of the stake into it, a solid piece of rubber may be used, which may enter holes or recesses in the two parts of the post A B. Or other appliances of rubber may be used, though I prefer the tubing or hose. The rubber performs several duties: it makes a universal joint; it acts as a weight or poise to keep the upper part of the stake in an erect position, and it holds the two parts of the stake together. Instead of fastening the cord C to the top of the pole B, it may pass through an eye, guide, or over a pulley at the top, and extend down and be fastened to a ring that may surround the pole and serve as a weight for taking up the slack of the cord and admit of a longer cord and more range for the animal.

Having thus described my invention, what I claim, is—

A tethering-stake or post made in two parts and united by a piece of rubber, as and for the purpose substantially as herein described and represented.

B. G. FITZHUGH.

Witnesses:
   A. B. STOUGHTON,
   EDM. F. BROWN.